(12) United States Patent
Mansouri et al.

(10) Patent No.: US 11,865,959 B2
(45) Date of Patent: Jan. 9, 2024

(54) FOLDABLE PED HOLDER

(71) Applicant: Safran Seats USA LLC, Gainesville, TX (US)

(72) Inventors: Reza Mansouri, Costa Mesa, CA (US); Charles Michael Parker, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 48 days.

(21) Appl. No.: 17/546,419

(22) Filed: Dec. 9, 2021

(65) Prior Publication Data
US 2023/0182632 A1   Jun. 15, 2023

(51) Int. Cl.
*B60N 3/00* (2006.01)
*B60R 11/02* (2006.01)
*B60R 11/00* (2006.01)
*B60R 1/02* (2006.01)

(52) U.S. Cl.
CPC ............... *B60N 3/004* (2013.01); *B60R 1/02* (2013.01); *B60R 2011/0015* (2013.01)

(58) Field of Classification Search
CPC ............... B60N 3/004; B64D 11/0638; B64D 11/00152
USPC ................................................. 297/146, 145
See application file for complete search history.

(56) References Cited

U.S. PATENT DOCUMENTS

| | | | | |
|---|---|---|---|---|
| 1,781,977 | A * | 11/1930 | Cummings | B60N 3/004 297/146 |
| 4,359,004 | A * | 11/1982 | Chappell | A47C 7/70 297/188.2 |
| 8,667,904 | B2 | 3/2014 | Pajic | |
| 11,008,103 | B1 | 5/2021 | Malecha | |
| 2005/0178297 | A1 | 8/2005 | Pipkin | |
| 2007/0200414 | A1 | 8/2007 | Pozzi | |
| 2007/0283855 | A1 * | 12/2007 | Pozzi | A47B 23/043 108/44 |

FOREIGN PATENT DOCUMENTS

EP   1172252 A1 *  1/2002  ............. B60N 3/004

OTHER PUBLICATIONS

PCT/US2022/049188, International Search Report and Written Opinion, dated Mar. 16, 2023.

* cited by examiner

*Primary Examiner* — Milton Nelson, Jr.
(74) *Attorney, Agent, or Firm* — Kilpatrick Townsend & Stockton LLP

(57) ABSTRACT

Described are tray table assemblies for a passenger seat, such as an aircraft passenger seat. The tray table assembly includes a tray table with a top surface and a holder assembly. The holder assembly includes a first holder pivotably attached to the tray table and a second holder pivotably attached to the first holder.

17 Claims, 3 Drawing Sheets

FOLDABLE PED HOLDER

FIELD OF THE INVENTION

The field of the invention relates to passenger seats, and, more particularly, to tray tables for passenger seats.

BACKGROUND

Passenger vehicles, such as aircraft, buses, trains, ships, and automobiles, include passenger seats in which passengers can be seated and otherwise use during travel. Traditionally, the living space for each passenger seat has offered passengers a limited ability to control and utilize their living space during travel, and the limited control and ability to utilize the living space may negatively affect the passenger's travel experience. For example, while some tray tables may include a personal electronic device (PED) holder, traditionally such PED holders are unable to stably support a PED and/or unable to accommodate different types of PEDs, and a passenger often must lean the PED against a seat back. In such cases, the PED may be damaged when the device is leaning against the seat back and when the seat back is moved to a taxiing, takeoff, and landing position as the device may lose contact with the seat back and potentially fall through the gap between the tray table and the seat back.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table assembly for a passenger seat includes a tray table with a top surface and a holder assembly. The holder assembly includes a first holder pivotably attached to the tray table and a second holder pivotably attached to the first holder.

In some embodiments, the top surface of the tray table includes a pocket, and the holder assembly is at least partially positioned within the pocket. The holder assembly may be movable between a stowed position and a deployed position relative to the top surface, and the second holder is movable between a folded position and an unfolded position relative to the first holder. In various embodiments, the holder assembly is movable between the stowed position and the deployed position independently from movement of the second holder between the folded position and the deployed position. In some cases, the top surface of the tray table includes a pocket, and in the stowed position and the folded position, the first holder and the second holder are positioned within the pocket. The second holder may be movable between the folded position and the deployed position when the holder assembly is in the deployed position relative to the top surface.

In various embodiments, the first holder includes a first surface and a second surface opposite from the first surface, and the second holder includes a third surface and a fourth surface opposite from the third surface of the second holder. The second holder may be movable between a folded position and an unfolded position relative to the first holder, and in the folded position, the second surface of the top holder faces the third surface of the second holder. In some cases, in the unfolded position, the first surface and the third surface face a first direction and the second surface of the first holder and the fourth surface of the second holder face a second direction opposite from the first direction. In various aspects, the second holder includes a positioning feature, and in the unfolded position, the positioning feature of the second holder at least partially overlaps the second surface of the first holder. According to various embodiments, the positioning feature may include a projection extending outwards from the second surface of the second holder. In certain embodiments, in the folded position, the first surface of the first holder is a topmost surface of the holder assembly and optionally is flush with the top surface of the tray table.

In various embodiments, the second holder is movable relative to the first holder between a folded position and an unfolded position, where, in the folded position, the holder assembly includes a first height, and in the unfolded position, the holder assembly includes a second height that is greater than the first height.

The first holder may be movable between a stowed position and a deployed position relative to the top surface of the tray table, and in the deployed position, the first holder is perpendicular to the top surface of the tray table. In some embodiments, at least one of a length or a width of the first holder is the same as a length and a width of the second holder, or the length or the width of the first holder is different from the length or the width of the second holder. In various embodiments, the tray table is a single leaf tray table or a bi-fold tray table.

According to certain embodiments of the present invention, a tray table assembly for a passenger seat includes a tray table with a top surface and a pocket defined in the top surface. The tray table assembly also includes a holder assembly with a first end, a second end opposite the first end, and a hinge between the first end and the second end. In certain embodiments, the first end is pivotably connected to the tray table within the pocket, and the second end is movable between a first position and a second position relative to the first end via the hinge.

In various embodiments, in the first position, the holder assembly includes a first height and, in the second position, the holder assembly includes a second height that is greater than the first height. In some embodiments, the holder assembly is movable between a stowed position and a deployed position relative to the top surface, where, in the stowed position, the first end and the second end are within the pocket, and in the deployed position, the first end is within the pocket and the second end is outside of the pocket.

According to certain embodiments of the present invention, a tray table assembly for a passenger seat includes a tray table with a top surface and a holder assembly with a first end and a second end opposite from the first end. In some embodiments, the first end is pivotably connected to the top surface of the tray table, and the holder assembly is movable between a folded configuration and an unfolded configuration. In various embodiments, in the folded configuration, the second end is adjacent to the first end, and in the unfolded configuration, the second end is spaced apart from the first end.

In certain embodiments, in the folded configuration, the holder assembly includes a first height, and in the unfolded configuration, the holder assembly includes a second height that is greater than the first height.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray tables with PED holder assemblies for passenger seats. While the tray tables with PED holder assemblies are discussed for use with aircraft seats, they are by no means so limited. Rather, embodiments of the tray tables with PED holder assemblies may be used in passenger seats or other seats of any type or otherwise as desired.

Figure 1:
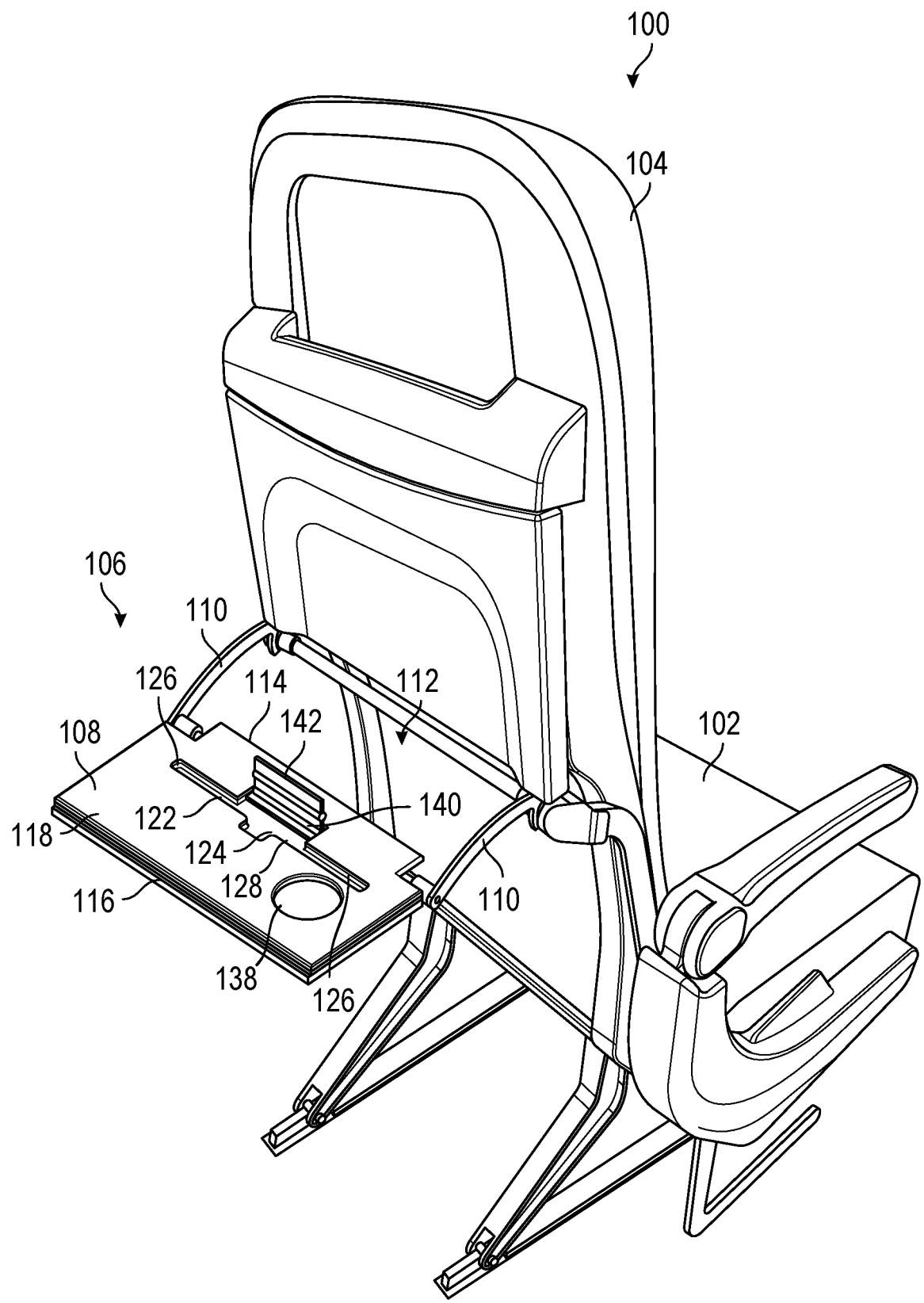
FIG. 1 is a perspective view of a passenger seat with a tray table and a PED holder assembly according to certain embodiments of the present invention.

According to certain embodiments of the present invention, as shown in FIG. 1, a passenger seat 100 includes a seat base 102 and a seat back 104. A tray table assembly 106 may be supported on the passenger seat 100 and includes a tray table 108 and one or more supports 110. In certain embodiments, the tray table 108 is movable between a stowed position and a deployed position relative to the seat back 104 via the support(s) 110 such that a passenger in an aft passenger seat (not illustrated) can selectively use the tray table assembly 106 as desired. FIG. 1 illustrates the tray table 108 in the deployed position. Optionally, and as illustrated in FIG. 1, when the tray table 108 is in the deployed position, a gap 112 may be defined between the tray table 108 and the seat back 104. Optionally, the tray table 108 may be slidable relative to the support(s) 110 to further position the tray table 108 relative to the seat back 104. As one non-limiting example, the tray table 108 may be slidable in an aft direction relative to the seat back 104 and when the tray table 108 is in the deployed position to position the tray table 108 closer to a passenger in the aft passenger seat. While the tray table 108 is illustrated as a single leaf tray table, in other embodiments the tray table 108 may have a plurality of leaves as desired. In one non-limiting example, in another embodiment the tray table 108 may be a bi-fold tray table with two leaves.

Figure 2:
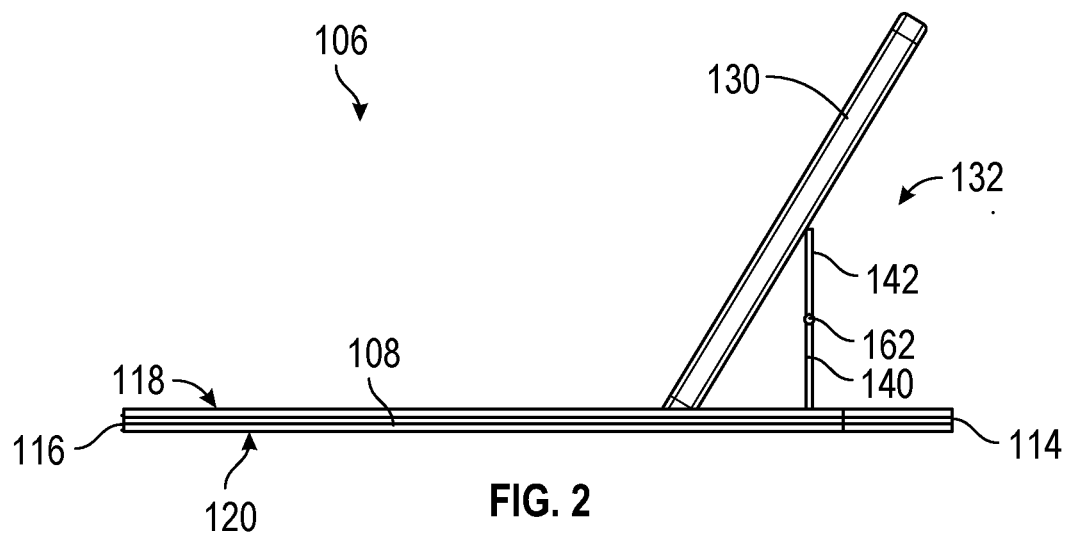
FIG. 2 is a side view of the tray table and PED holder assembly of FIG. 1.

The tray table 108 may be formed of materials including but not limited to aluminum, stainless steel, aramid fibers, polycarbonate, polypropylene, other metallic materials, composite materials, and/or other similar materials as desired. As illustrated in FIGS. 1 and 2, the tray table 108 generally includes a forward end 114 and an aft end 116 opposite from the forward end 114. The tray table 108 also includes a top surface 118 and a bottom surface 120 opposite form the top surface 118. In certain embodiments, when the tray table 108 is in the deployed position, the top surface 118 generally faces upwards and the aft end 116 optionally is an aft-most portion of the tray table assembly 106. In some embodiments, when the tray table 108 is in the stowed position, the top surface 118 may face (and/or contact) the seat back 104, and the bottom surface 120 may face outwards and in the aft direction relative to the seat back 104.

In certain embodiments, the tray table 108 includes pocket 122 in the top surface 118 having a pocket surface 124 that is recessed into the tray table 108 relative to the top surface 118. In some embodiments, the pocket 122 may be closer to the forward end 114 than to the aft end 116, although the particular location of the pocket 122 in the top surface 118 should not be considered limiting. The pocket 122 includes at least a holder portion 128, and in certain embodiments, the pocket 122 includes one or more amenities portions 126. In some embodiments, the holder portion 128 may be substantially centered between opposing ends of the pocket 122 and/or between amenities portions 126, although it need not be in other embodiments.

The amenities portions 126 of the pocket 122 may be utilized for receiving an edge of a PED 130 (see FIG. 2) of a passenger and/or receiving other objects and/or items as desired by the passenger. The holder portion 128 of the pocket 122 receives at least a portion of a holder assembly 132 of the tray table assembly 106 and as discussed in detail below. In certain embodiments, a width of the holder portion 128 (i.e., a dimension in the forward and aft direction) is different form a width of the amenities portions 126. As one non-limiting example and as illustrated in FIG. 1, the width of the holder portion 128 may be greater than the width of the amenities portions 126. In other embodiments, the widths of the portions 126, 128 may be substantially the same and/or otherwise sized as desired. Accordingly, the particular shapes and profiles of the pocket 122, the amenities portion(s) 126, and/or the holder portion 128 should not be considered limiting. As one non-limiting example, in other embodiments, the amenities portion(s) 126 may be omitted, and the pocket 122 may optionally only include the holder portion 128.

Optionally, in addition to the pocket 122 that at least includes the holder portion 128, the tray table 108 may include one or more other amenities recesses or pockets 138 on the top surface 118. In the embodiment illustrated in FIG.

1, the tray table 108 includes an amenities pocket 138 for selecting receiving a beverage container and/or facilitating positioning of a beverage container on the tray table 108. However, the particular amenities pocket 138 should not be considered limiting, and in other embodiments, the tray table 108 may include any number of amenities pockets 138 (including none) at any location on the tray table 108 and/or to accommodate various devices or items as desired.

As mentioned, in addition to the tray table 108, the tray table assembly 106 includes the holder assembly 132. In certain embodiments, and as illustrated in FIG. 2, for example, the holder assembly 132 may be utilized by a passenger to support her or his PED 130. The holder assembly 132 generally includes at least a first holder 140 and a second holder 142. In other embodiments, the holder assembly 132 may include additional holders as desired. The holders 140, 142 of the tray table assembly 106 may be constructed from various materials as desired. In certain embodiments, the holders 140, 142 may be constructed from materials similar to those of the tray table 108, although they need not be in other embodiments.

The first holder 140 of the holder assembly 132 includes a first end 144, a second end 146 opposite from the first end 144, a first surface 148, and a second surface 150 opposite from the first surface 148. Similarly, the second holder 142 of the holder assembly 132 includes a first end 152, a second end 154 opposite from the first end 152, a third surface 156, and a fourth surface 158 opposite from the third surface 156. In certain embodiments, the first end 144 of the first holder 140 is the first end of the overall holder assembly 132 and the second end 154 of the second holder 142 is the second end of the overall holder assembly 132. In the embodiment illustrated, the first holder 140 may be substantially the same as the second holder 142; however, in other embodiments, at least one characteristic of the second holder 142 may be different from the first holder 140. As some non-limiting examples, in other embodiments, a length and/or a width of the first holder 140 may be different from a length or a width of the second holder 142.

Figure 3A:
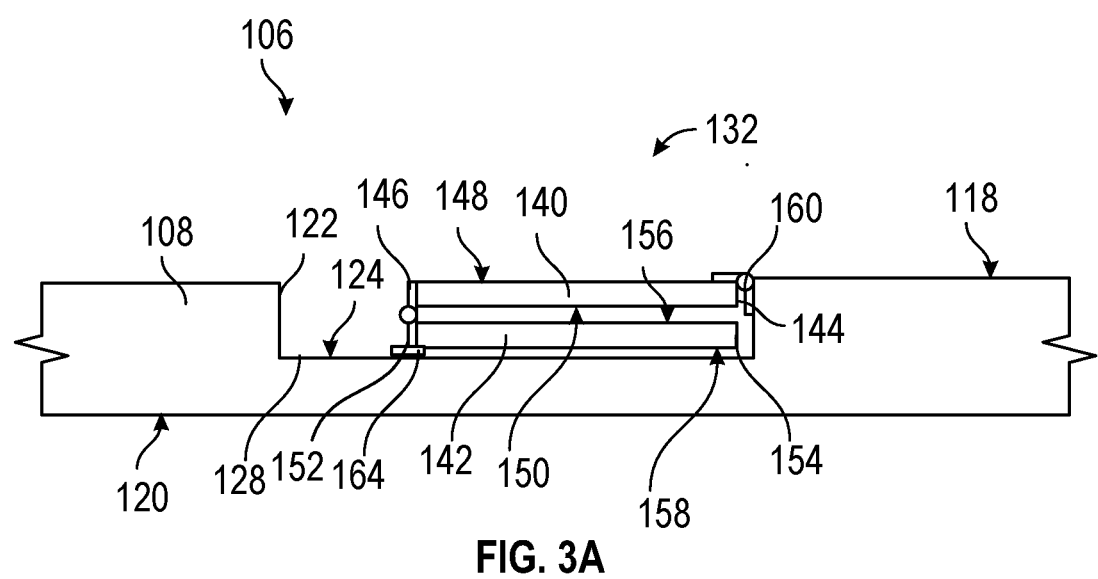
FIG. 3A is a sectional view of the tray table and the PED holder assembly of FIG. 1 with the PED holder assembly in a stowed position.
Figure 3B:
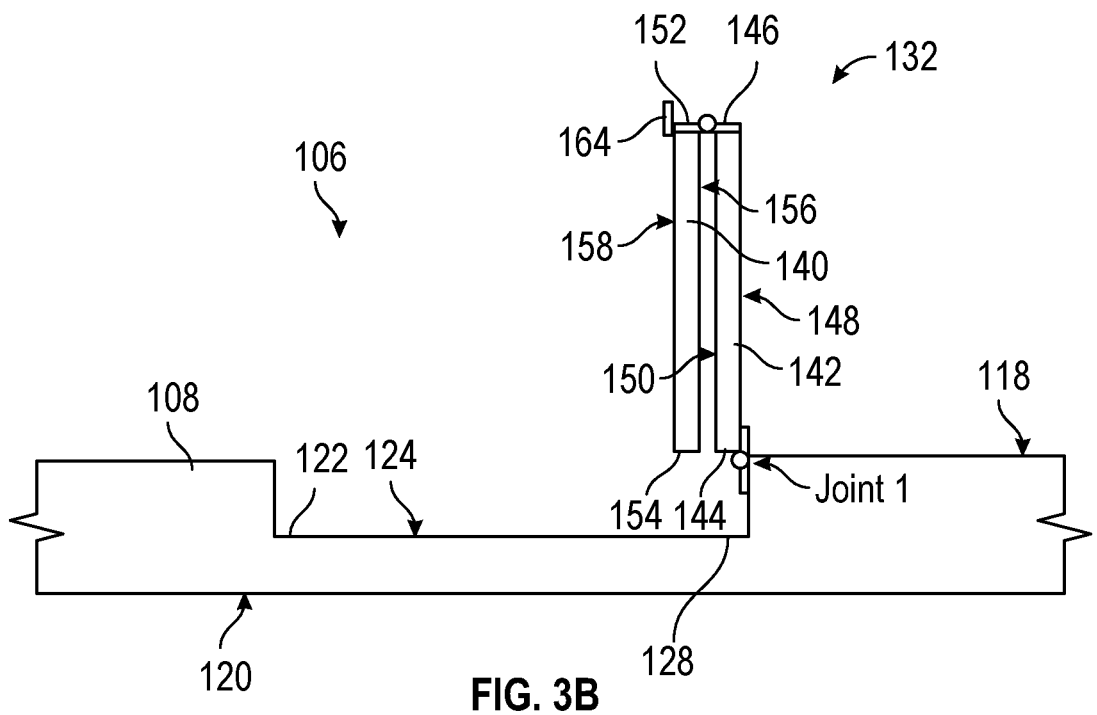
FIG. 3B is a sectional view of the tray table and the PED holder assembly of FIG. 1 with the PED holder assembly in a deployed and folded position.
Figure 3C:
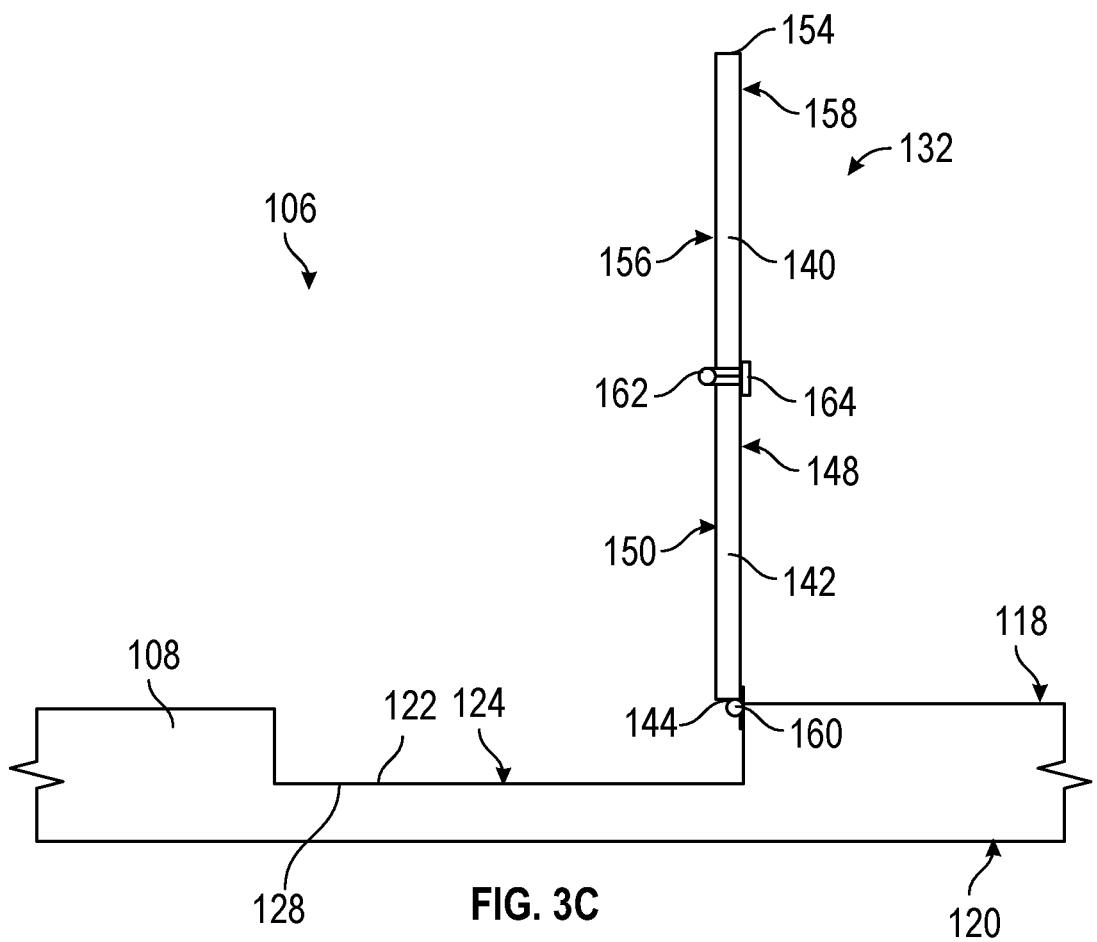
FIG. 3C is a sectional view of the tray table and the PED holder assembly of FIG. 1 with the PED holder assembly in a deployed and unfolded position.

In various embodiments, as best illustrated in FIGS. 3A-C, the first end 144 of the first holder 140 is pivotably attached to the tray table 108 within the pocket 122 via a pivoting mechanism or device 160. The pivoting mechanism 160 may be various suitable mechanisms or devices as desired, including but not limited to pins, hinges, etc. The first end 144 of the first holder 140 pivotably attached to the tray table 108 enables movement of the holder assembly 132 between a stowed position (FIG. 3A) and a deployed position (FIGS. 3B-C) relative to the pocket 122. In some optional examples, at least a portion of the holder assembly 132 is within the pocket 122 in both the stowed and deployed positions of the holder assembly 132.

In various embodiments, the first end 152 of the second holder 142 is pivotably attached to the second end 146 of the first holder 140 via a pivoting mechanism or device 162. In certain embodiments, the second holder 142 pivotably attached to the first holder 140 enables movement of the second holder 142 between a folded position (FIGS. 3A-B) and an unfolded position (FIG. 3C) relative to the first holder 140. In some embodiments, and as illustrated in FIG. 3A, the second holder 142 is in the folded position when the first holder 140 is in the stowed position. The second holder 142 optionally may be movable between the folded position and the unfolded position while the first holder 140 is in the deployed position. In some embodiments, the holder assembly 132 is movable between the stowed position and the deployed position independently from movement between the folded position and the deployed position. However, in other embodiments, the holders 140, 142 may be coupled such that movement of the first holder 140 from the stowed position to the deployed position automatically moves the second holder 142 from the folded position to the unfolded position and vice versa.

Referring to FIG. 3A, in certain embodiments, in the folded and stowed positions, the second surface 150 of the first holder 140 may face the third surface 156 of the second holder 142. Optionally, in the folded and stowed positions of the holder assembly 132, the first surface 148 of the first holder 140 may be substantially flush with the top surface 118 of the tray table 108. In various embodiments, the holder assembly 132 in the folded and stowed positions is a minimum height of the holder assembly 132 relative to the top surface 118.

Referring to FIG. 3B, in the folded and deployed positions, the first surface 148 of the first holder 140 may face a first (e.g., forward) direction, and the fourth surface 158 may face a second (e.g., aft) direction opposite from the first direction. In various embodiments, the holder assembly 132 in the folded and deployed positions is an intermediate height of the holder assembly 132 relative to the top surface 118.

Referring to FIG. 3C, in the unfolded and deployed positions, the first surface 148 and the fourth surface 158 may face the first direction, and the second surface 150 and the third surface 156 may face the second direction. In various embodiments, the holder assembly 132 in the unfolded and deployed positions is a maximum height of the holder assembly 132 relative to the top surface 118. In certain embodiments, a user may utilize the holder assembly 132 to support the PED 130 when the holder assembly 132 is in the folded and deployed positions (FIG. 3B) or in the unfolded and deployed positions (FIG. 3C) as desired.

Optionally, and as illustrated in FIGS. 3A-C, one or more positioning feature(s) 164 may be provided to limit movement of the second holder 142 relative to the first holder 140. In the embodiment illustrated, the positioning feature 164 extends from the second holder 142 and selectively overlaps the first surface 156 of the first holder 140 in the unfolded position to limit movement of the second holder 142 relative to the first holder 140. In other embodiments, the positioning feature 164 may be provided on the first holder 140 and/or may be various other devices or mechanisms as desired for selectively limiting movement of the second holder 142 relative to the first holder 140.

In the following, further examples are described to facilitate the understanding of the invention.

Example A. A tray table assembly for a passenger seat, the tray table assembly comprising: a tray table comprising a top surface; and a holder assembly comprising: a first holder pivotably attached to the tray table; and a second holder pivotably attached to the first holder.

Example B. The tray table assembly of any of the preceding or subsequent examples, wherein the top surface of the tray table comprises a pocket, and wherein the holder assembly is at least partially positioned within the pocket.

Example C. The tray table assembly of any of the preceding or subsequent examples, wherein the holder assembly is movable between a stowed position and a deployed position relative to the top surface, and wherein the second holder is movable between a folded position and an unfolded position relative to the first holder.

Example D. The tray table assembly of any of the preceding or subsequent examples, wherein the holder assembly is movable between the stowed position and the deployed position independently from movement of the second holder between the folded position and the deployed position.

Example E. The tray table assembly of any of the preceding or subsequent examples, wherein the top surface of the tray table comprises a pocket, and wherein, in the stowed position and the folded position, the first holder and the second holder are positioned within the pocket.

Example F. The tray table assembly of any of the preceding or subsequent examples, wherein the second holder is movable between the folded position and the deployed position when the holder assembly is in the deployed position relative to the top surface.

Example G. The tray table assembly of any of the preceding or subsequent examples, wherein the first holder comprises a first surface and a second surface opposite from the first surface, wherein the second holder comprises a third surface and a fourth surface opposite from the third surface of the second holder, wherein the second holder is movable between a folded position and an unfolded position relative to the first holder, and wherein, in the folded position, the second surface of the top holder faces the third surface of the second holder.

Example H. The tray table assembly of any of the preceding or subsequent examples, wherein, in the unfolded position, the first surface and the third surface face a first direction and the second surface of the first holder and the fourth surface of the second holder face a second direction opposite from the first direction.

Example I. The tray table assembly of any of the preceding or subsequent examples, wherein the second holder comprises a positioning feature, and wherein, in the unfolded position, the positioning feature of the second holder at least partially overlaps the second surface of the first holder.

Example J. The tray table assembly of any of the preceding or subsequent examples, wherein the positioning feature comprises a projection extending outwards from the second surface of the second holder.

Example K. The tray table assembly of any of the preceding or subsequent examples, wherein, in the folded position, the first surface of the first holder is a topmost surface of the holder assembly and optionally is flush with the top surface of the tray table.

Example L. The tray table assembly of any of the preceding or subsequent examples, wherein the second holder is movable relative to the first holder between a folded position and an unfolded position, wherein, in the folded position, the holder assembly comprises a first height, and wherein, in the unfolded position, the holder assembly comprises a second height that is greater than the first height.

Example M. The tray table assembly of any of the preceding or subsequent examples, wherein the first holder is movable between a stowed position and a deployed position relative to the top surface of the tray table, and wherein, in the deployed position, the first holder is perpendicular to the top surface of the tray table.

Example N. The tray table assembly of any of the preceding or subsequent examples, wherein at least one of a length or a width of the first holder is the same as a length and a width of the second holder, or, wherein the length or the width of the first holder is different from the length or the width of the second holder.

Example O. The tray table assembly of any of the preceding or subsequent examples, wherein the tray table is a single leaf tray table or a bi-fold tray table.

Example P. A tray table assembly for a passenger seat, the tray table assembly comprising: a tray table comprising a top surface and a pocket defined in the top surface; and a holder assembly comprising a first end, a second end opposite the first end, and a hinge between the first end and the second end, wherein the first end is pivotably connected to the tray table within the pocket, and wherein the second end is movable between a first position and a second position relative to the first end via the hinge.

Example Q. The tray table assembly of any of the preceding or subsequent examples, wherein, in the first position, the holder assembly comprises a first height and, in the second position, the holder assembly comprises a second height that is greater than the first height.

Example R. The tray table assembly of any of the preceding or subsequent examples, wherein the holder assembly is movable between a stowed position and a deployed position relative to the top surface, wherein, in the stowed position, the first end and the second end are within the pocket, and wherein, in the deployed position, the first end is within the pocket and the second end is outside of the pocket.

Example S. A tray table assembly for a passenger seat, the tray table assembly comprising: a tray table comprising a top surface; and a holder assembly comprising a first end and a second end opposite from the first end, wherein the first end is pivotably connected to the top surface of the tray table, and wherein the holder assembly is movable between a folded configuration and an unfolded configuration, wherein, in the folded configuration, the second end is adjacent to the first end, and wherein, in the unfolded configuration, the second end is spaced apart from the first end.

Example T. The tray table assembly of any of the preceding or subsequent examples, wherein, in the folded configuration, the holder assembly comprises a first height, and wherein, in the unfolded configuration, the holder assembly comprises a second height that is greater than the first height.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly for a passenger seat, the tray table assembly comprising:
    a tray table comprising a top surface; and
    a holder assembly comprising:
        a first holder pivotably attached to the tray table; and
        a second holder pivotably attached to the first holder,
        wherein the holder assembly is movable between a stowed position and a deployed position relative to the top surface of the tray table,
        wherein the first holder comprises a first surface and a second surface opposite from the first surface,
        wherein the second holder comprises a third surface and a fourth surface opposite from the third surface of the second holder, wherein the second holder is movable between a folded position and an unfolded position relative to the first holder, wherein, in the folded position, the second surface of the top holder faces the third surface of the second holder, and wherein, in the folded position and in the stowed position, the first surface of the first holder is a topmost surface of the holder assembly and optionally is flush with the top surface of the tray table.

2. The tray table assembly of claim 1, wherein the top surface of the tray table comprises a pocket, and wherein the holder assembly is at least partially positioned within the pocket.

3. The tray table assembly of claim 1, wherein the tray table is a single leaf tray table or a bi-fold tray table.

4. The tray table assembly of claim 1, wherein the holder assembly is movable between the stowed position and the deployed position independently from movement of the second holder between the folded position and the deployed position.

5. The tray table assembly of claim 4, wherein the top surface of the tray table comprises a pocket, and wherein, in the stowed position and the folded position, the first holder and the second holder are positioned within the pocket.

6. The tray table assembly of claim 1, wherein the second holder is movable between the folded position and the unfolded position when the holder assembly is in the deployed position relative to the top surface.

7. The tray table assembly of claim 1, wherein at least one of a length or a width of the first holder is the same as a length and a width of the second holder, or, wherein the length or the width of the first holder is different from the length or the width of the second holder.

8. The tray table assembly of claim 1, wherein, in the unfolded position, the first surface and the third surface face a first direction and the second surface of the first holder and the fourth surface of the second holder face a second direction opposite from the first direction.

9. The tray table assembly of claim 1, wherein the second holder comprises a positioning feature, and wherein, in the unfolded position, the positioning feature of the second holder at least partially overlaps the second surface of the first holder.

10. The tray table assembly of claim 9, wherein the positioning feature comprises a projection extending outwards from the second surface of the second holder.

11. The tray table assembly of claim 1, wherein, in the deployed position, the first holder is perpendicular to the top surface of the tray table.

12. The tray table assembly of claim 1, wherein, in the folded position and the deployed position, the holder assembly comprises a first height, and wherein, in the unfolded position and the deployed position, the holder assembly comprises a second height that is greater than the first height.

13. A tray table assembly for a passenger seat, the tray table assembly comprising:
a tray table comprising a top surface; and
a holder assembly comprising a first end and a second end opposite from the first end,
wherein the first end is pivotably connected to the top surface of the tray table and is movable between a stowed position and a deployed position relative to the top surface,
wherein the second end is detached from the tray table,
wherein, in the deployed position, the holder assembly extends upwards relative to the top surface of the tray table,
wherein, in the deployed position, the holder assembly is movable between a folded configuration and an unfolded configuration,
wherein, in the folded configuration, the second end is adjacent to the first end and the holder assembly extends upwards relative to the top surface of the tray table,
wherein, in the folded position, a portion of the holder assembly defining the second end overlaps a portion of the holder assembly defining the first end, and
wherein, in the unfolded configuration, the second end is spaced apart from the first end and the holder assembly extends upwards relative to the top surface of the tray table.

14. The tray table assembly of claim 13, wherein, in the folded configuration, the holder assembly comprises a first height, and wherein, in the unfolded configuration, the holder assembly comprises a second height that is greater than the first height.

15. A tray table assembly for a passenger seat, the tray table assembly comprising:
a tray table comprising a top surface and a pocket defined in the top surface; and
a holder assembly comprising:
a first end,
a second end opposite the first end, and
a hinge between the first end and the second end,
wherein the second end is detached from the tray table,
wherein the first end is pivotably connected to the tray table within the pocket such that the holder assembly is movable between a stowed position and a deployed position relative to the top surface,
wherein, in the stowed position, the holder assembly is within the pocket,
wherein the second end is movable between a folded position and an unfolded position relative to the first end via the hinge,
wherein, in the folded position, a portion of the holder assembly defining the second end overlaps a portion of the holder assembly defining the first end, and
wherein, in the deployed position and the unfolded position, the second end defines a maximum height of the holder assembly and the holder assembly extends away from the pocket.

16. The tray table assembly of claim 15, wherein, in the deployed position, the first end is within the pocket and the second end is outside of the pocket.

17. The tray table assembly of claim 15, wherein, in the stowed position, the holder assembly comprises a minimum height and, in the deployed position and the folded position, the holder assembly comprises an intermediate height greater than the minimum height and less than the maximum height.

* * * * *